United States Patent
Giogoli et al.

(10) Patent No.: US 6,742,473 B1
(45) Date of Patent: Jun. 1, 2004

(54) MACHINE FOR COATING GRANULAR ARTICLES AND THE LIKE

(75) Inventors: Antonio Giogoli, Bologna (IT); Angelo Scipioni, Bologna (IT)

(73) Assignee: G.S. S.r.l. Coating System, Bologna (IT)

(*) Notice: Subject to any disclaimer, the term of this patent is extended or adjusted under 35 U.S.C. 154(b) by 0 days.

(21) Appl. No.: 10/110,379

(22) PCT Filed: Sep. 28, 2000

(86) PCT No.: PCT/IB00/01388

§ 371 (c)(1),
(2), (4) Date: May 16, 2002

(87) PCT Pub. No.: WO01/26601

PCT Pub. Date: Apr. 19, 2001

(30) Foreign Application Priority Data

Oct. 15, 1999 (IT) .......................................... BO99A0553

(51) Int. Cl.⁷ ............................................... A23G 3/26
(52) U.S. Cl. ........................... 118/19; 118/303; 118/58; 34/134
(58) Field of Search ............... 118/17, 19, 20, 118/24, 418, 303, 58; 34/134, 140, 130

(56) References Cited

U.S. PATENT DOCUMENTS

| 3,302,608 | A | | 2/1967 | Coons et al. |
| 3,874,092 | A | | 4/1975 | Huttlin |
| 4,543,906 | A | | 10/1985 | Glatt et al. |
| 4,602,440 | A | * | 7/1986 | Genoni .......................... 34/134 |
| 5,334,244 | A | * | 8/1994 | Bohle ........................... 118/19 |

FOREIGN PATENT DOCUMENTS

| EP | 0 056 573 A2 | 7/1982 |
| EP | 0 131 152 A1 | 1/1985 |
| EP | 0 545 044 A2 | 6/1993 |
| FR | 2.133.243 | 11/1972 |

OTHER PUBLICATIONS

English Translation Abstract EP 056573.*

* cited by examiner

Primary Examiner—Richard Crispino
Assistant Examiner—Yewebdar Tadesse
(74) Attorney, Agent, or Firm—William J. Sapone; Coleman Sudol Sapone, P.C.

(57) ABSTRACT

A machine for coating granular articles and the like includes a rotating drum or a coating pan (1), which receives a predetermined mass of articles to be treated. The machine includes also a tubular manifold (4), whose axis is parallel to the axis of said coating pan (1) and which communicates with an outer first pipe (5). A plurality of perforated hollow bodies (14) extend from said manifold (4) and are dipped into the moving mass of the articles to be treated. A second pipe (6) communicates with the coating pan (1), so as to create a flow of air for ventilating the articles. The perforated hollow bodies (14) are telescopic, so as to allow adjustment of their length in order to change the depth of penetration thereof in the moving mass of the articles inside the coating pan (1). The perforated hollow bodies (14) have a distal part (14b), which is inclined with respect to the hollow body vertical axis and whose cross-section is oblong with pointed ends. The first pipe (5) and second pipe (6) are aimed at being connected, by a commutation member (7), alternately to a tube (8) introducing air for drying treated articles and to a discharge tube (9).

7 Claims, 6 Drawing Sheets

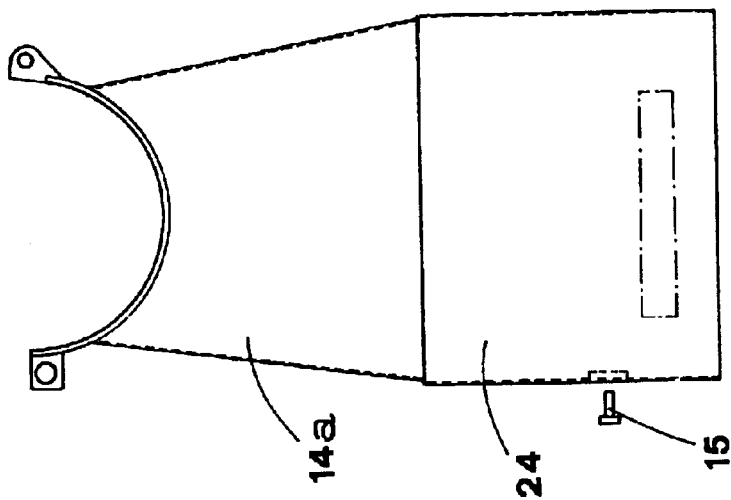
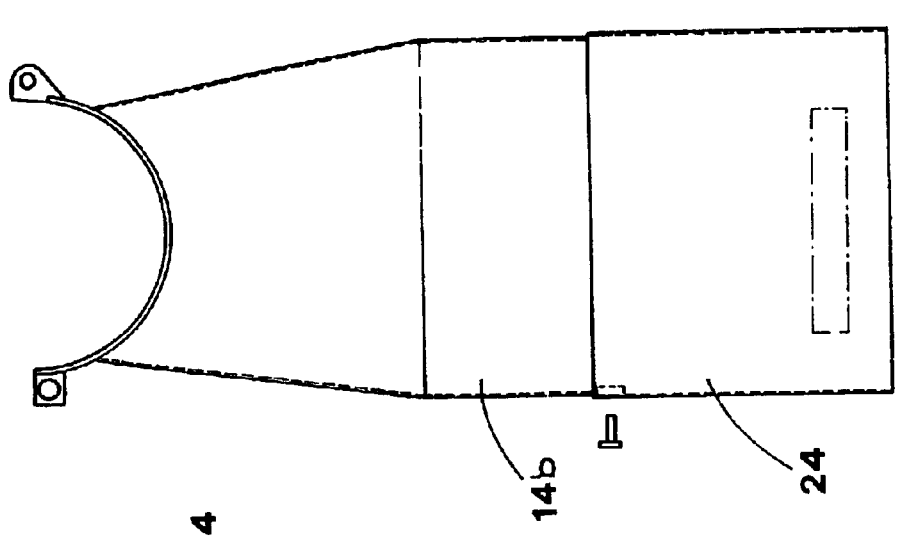
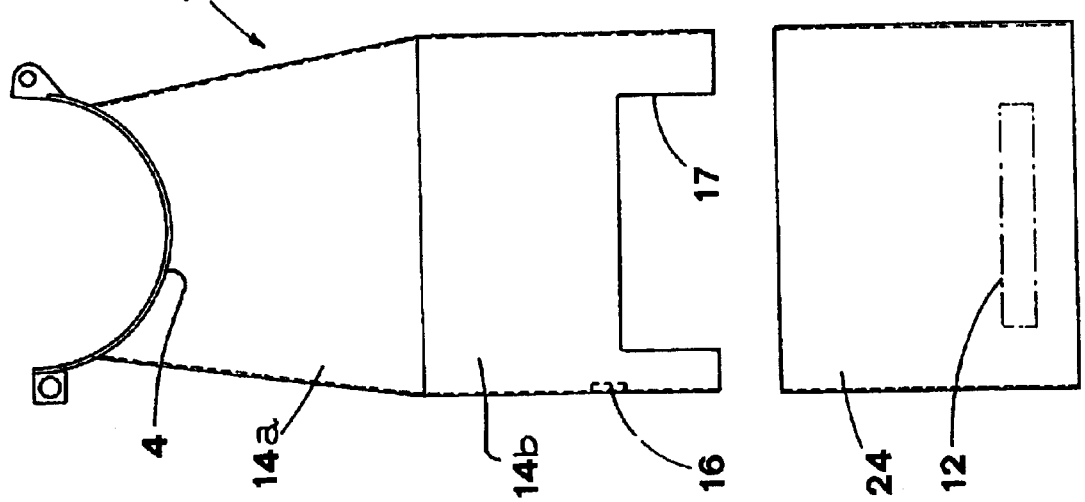

MACHINE FOR COATING GRANULAR ARTICLES AND THE LIKE

FIELD OF THE INVENTION

The present invention relates to machines for coating granular articles, such as pharmaceutical or confectionery products, with an outer layer.

DESCRIPTION OF THE PRIOR ART

Currently, articles to be treated are coated in machines equipped with a rotating drum, called coating pan, inside which they are put.

The coating pan is connected with perforated hollow bodies, which extend from a manifold whose axis is parallel to the rotating drum axis and which are immersed in the moving mass of articles to be treated.

A suitable liquid mixture is sprayed on the articles through nozzles, so as to form a protective coating.

Afterwards, a flow of hot air is sent into the articles mass, so as to dry the coating layer.

According to a known solution, the ventilation air is freely introduced into the coating pan by a pipe connected to the rear part thereof and later it is aspirated by the above mentioned perforated hollow bodies immersed in the mass of articles.

According to another use of the above mentioned machine, the neutral granules are coated with mixtures of active principles and excipients, so as to form e.g. controlled release medicine pellets.

In this case, a predetermined quantity of neutral granules are introduced into the coating pan, so as to be covered, with help of a suitable binder, with layers of mixed powders containing active principles and excipients.

The ventilation air is introduced through the above mentioned perforated hollow bodies and sucked by a pipe connected to the rear part of the coating pan.

One of disadvantages of the known machines derives from the fact that the ventilation of the articles by the perforated hollow bodies is not always performed at the best.

SUMMARY OF THE INVENTION

The object of the present invention is to propose a machine for coating granular articles, which allows to optimize the penetration of perforated hollow bodies into the moving mass of the articles to be treated.

Another object of the present invention is to propose a very versatile machine, which can be used either for coating pharmaceutical or confectionery products with an outer protective layer, or coating the neutral granules with mixtures of active principles and excipients to obtain e.g. pharmaceutical pellets.

The above mentioned objects are obtained, in accordance with the claims, by a machine for coating granular articles and the like, including:

a rotating drum or coating pan rotating around a rotational axis and containing a predetermined mass of articles to be treated;

a tubular manifold having axis parallel to the rotational axis of said coating pan and set in communication with an outer first pipe;

a plurality of perforated hollow bodies, extending from said manifold and dipped into the moving mass of said articles being treated;

a second pipe connected to said coating pan to create a flow of air for ventilating said articles.

According to a first embodiment, the perforated hollow bodies are telescopic, so as to allow adjustment of their length in order to change the depth of penetration in the moving mass of said articles inside the coating pan.

According to a second embodiment, the perforated hollow bodies have a distal part inclined with respect to a vertical axis of said hollow body and whose cross-section is oblong with pointed ends.

According to a third embodiment, the first pipe and second pipe are aimed at being connected, by a commutation member, alternately to a tube introducing air for drying treated articles and to a discharge tube.

BRIEF DESCRIPTION OF THE DRAWINGS

The characteristic features of the invention are pointed out in the following description, with particular reference to the enclosed drawings, in which:

FIG. 6 is a front view of a telescopic perforated hollow body;

FIGS. 7 and 8 are front views of the telescopic perforated hollow body, respectively in minimum and maximum extension;

BEST MODES OF CARRYING OUT THE INVENTION

Figure 1:
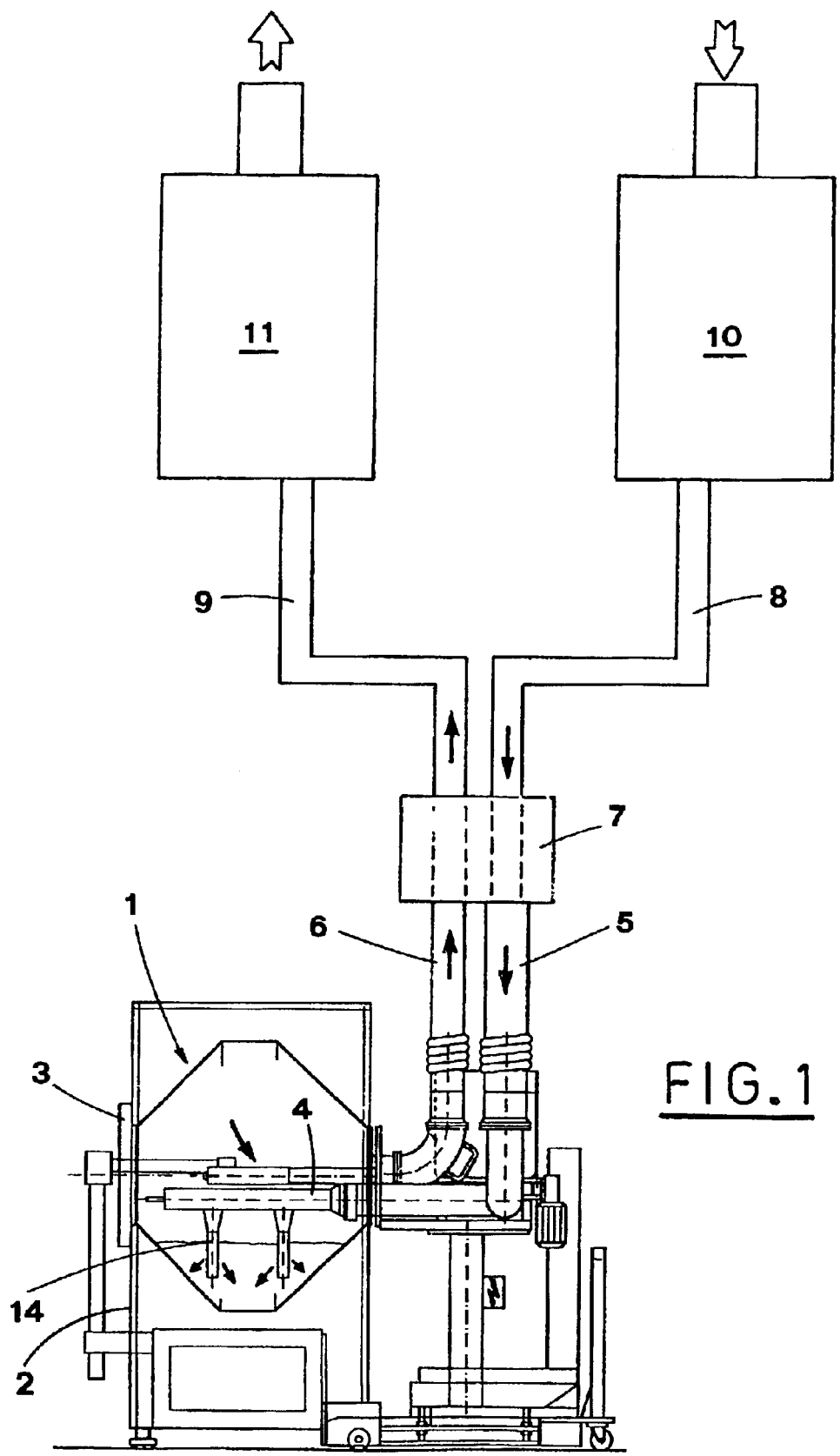
FIG. 1 is a schematic section view of the proposed machine for coating granular articles.

With reference to the above described figures, reference numeral 1 indicates a rotating drum or coating pan, which receives the articles to be treated.

The coating pan is formed e.g. by a central cylindrical part and two terminal truncated cone parts.

The coating pan 1 is rotatably carried by a stationary framework 2, The rotational axis of the coating pan is horizontal, and its front part features an opening 3 for introducing articles.

A tubular manifold 4 is situated inside the coating pan 1, with the axis of the manifold parallel to the axis of the coating pan.

The tubular manifold 4 communicates with an outer pipe 5.

A pair of perforated hollow bodies 14 extend from the manifold 4, so as to be dipped into the moving mass of the articles to be treated.

The rear part of the coating pan 1 communicates with a second pipe 6.

The first and the second pipes 5, 6 are aimed at being connected, by a commutation member 7, to a discharge pipe 9, and to a pipe. 8, through which the air for drying the articles to be treated is introduced.

The pipe 8 and the discharge pipe 9 are equipped with filters 10, 11, respectively for depuration of the introduced air and for avoiding spreading out of emitted substances.

More precisely, when in a first working configuration, shown in FIG. 1, the manifold 4 is connected, by the first pipe 5, to the air introducing pipe 8, while the second pipe 6 is connected to the discharge pipe 9.

In this configuration, the ventilation air is introduced by the perforated hollow bodies 14 into the moving mass of the articles, e.g. microgranules aimed at forming controlled release medicine pellets.

Figure 2:
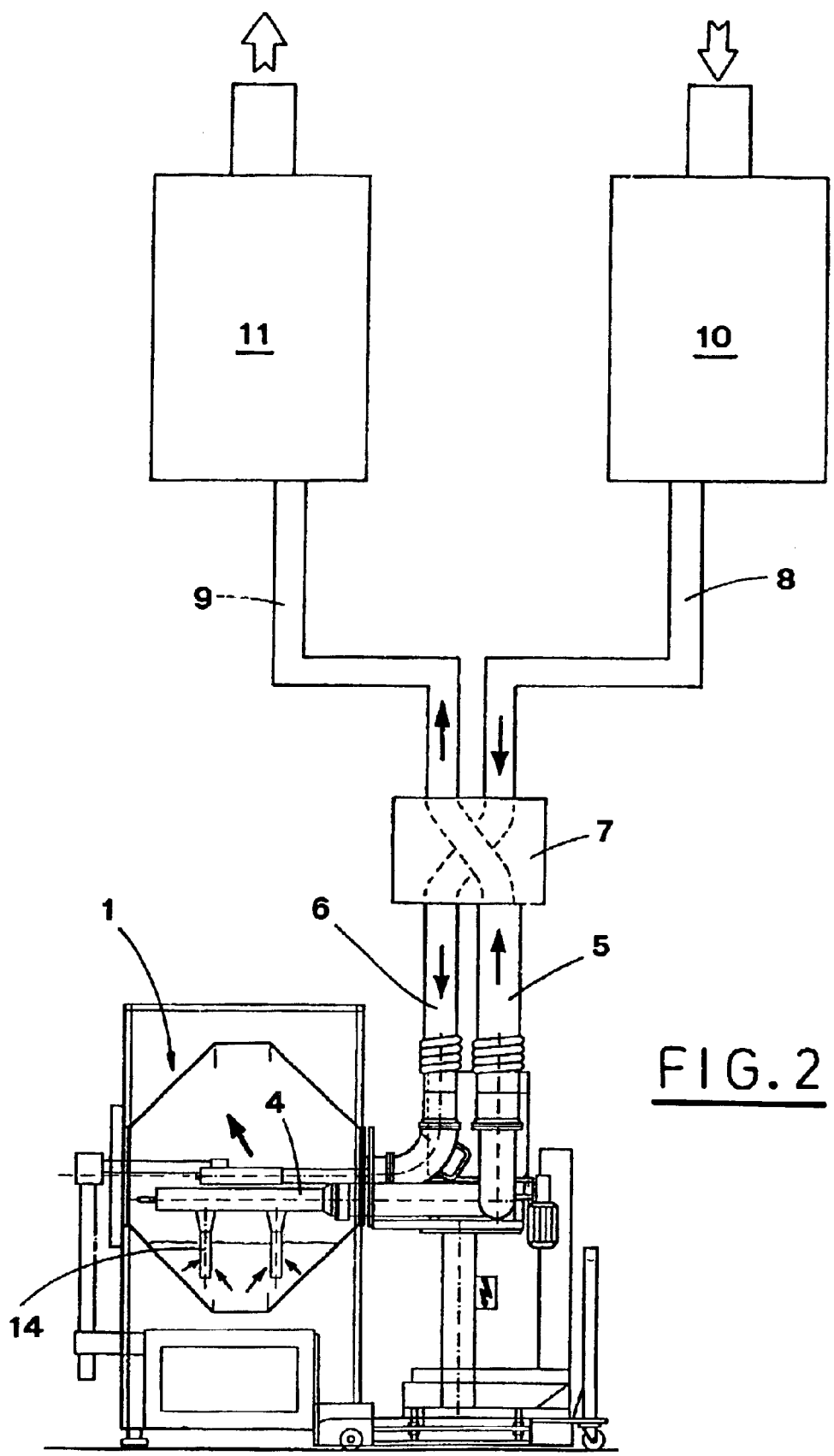
FIG. 2 is the same section view of the proposed machine in a different working configuration.
Figure 3:
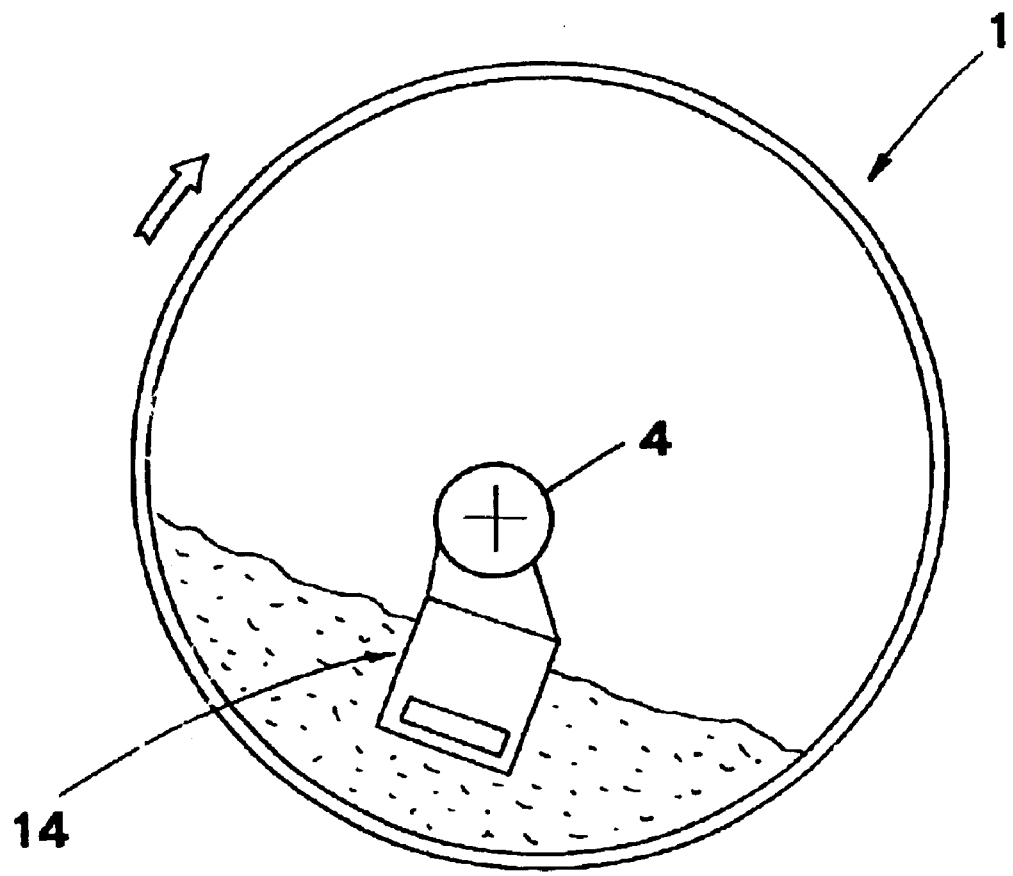
FIG. 3 is a detailed side view of the coating pan of the proposed machine.

In a second working configuration, shown in FIG. 2, the commutation member 7 is operated, so as to connect the manifold 4, by the first pipe 5, with the discharge pipe 9 and to connect the second pipe 6 with the air introducing pipe 8.

In this configuration, the ventilation air is introduced freely into the coating pan 1 and sucked by the perforated hollow bodies 14, so as to e.g. dry traditional pharmaceutical or confectionery products coated with a protective layer.

Figure 4:
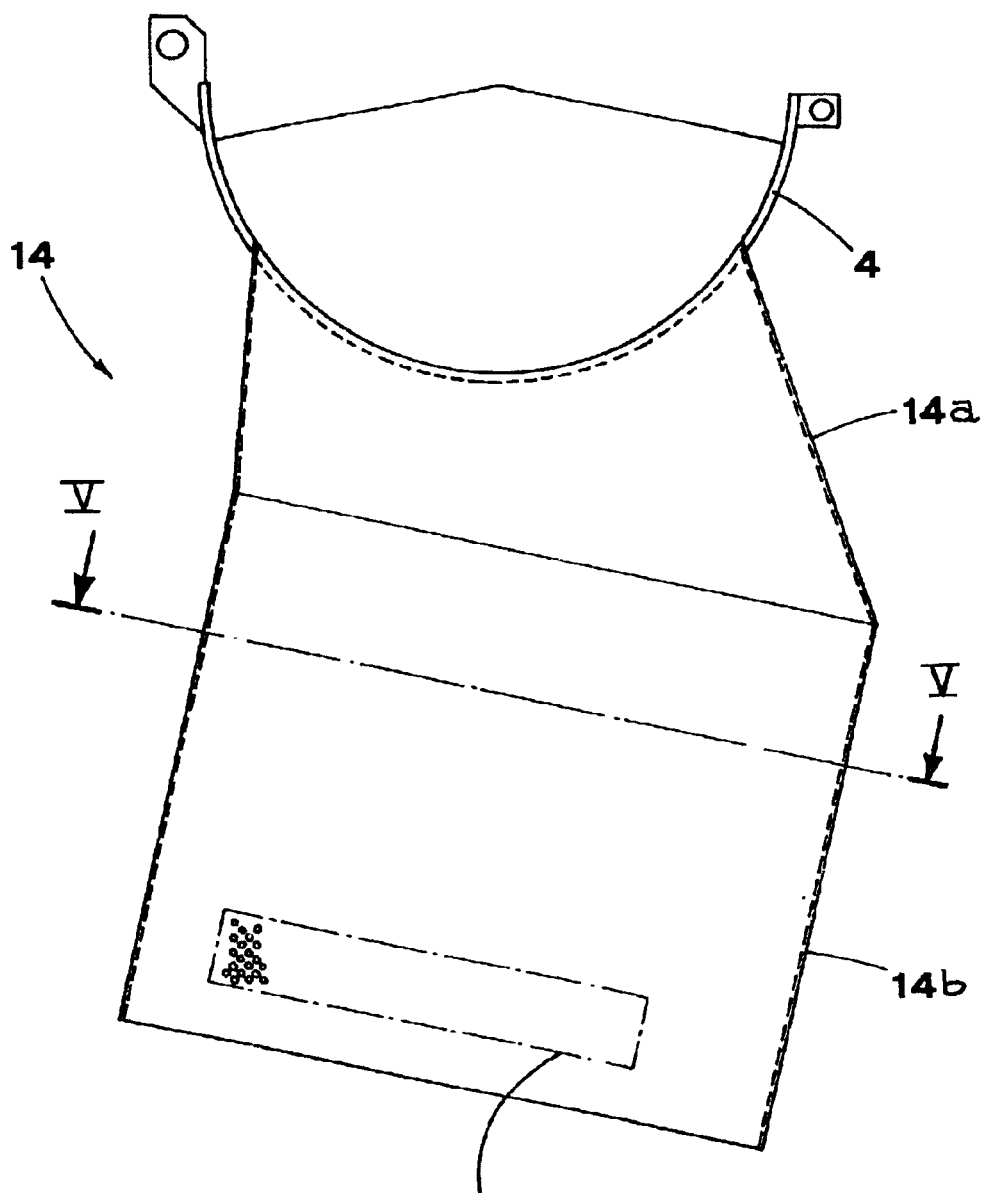
FIG. 4 is a front view of a perforated hollow body of the proposed machine.

The perforated hollow bodies 14 include preferably a proximal part 14a, which extends from the manifold 4 and has a countersunk shape, and a distal part 14b, which is inclined with respect to the vertical axis of the hollow body (FIG. 4).

Figure 5:
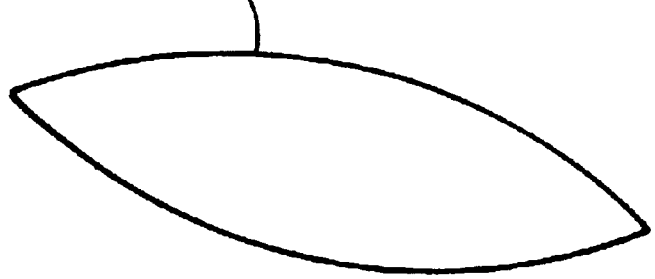
FIG. 5 is a cross-section view of the perforated hollow body taken along V—V of FIG. 4.
Figure 10:
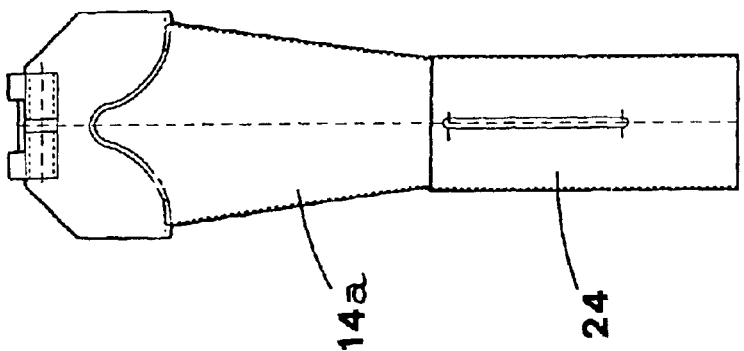
FIGS. 9, 10 and 11 are corresponding lateral views of the above mentioned telescopic perforated hollow body.
Figure 11:
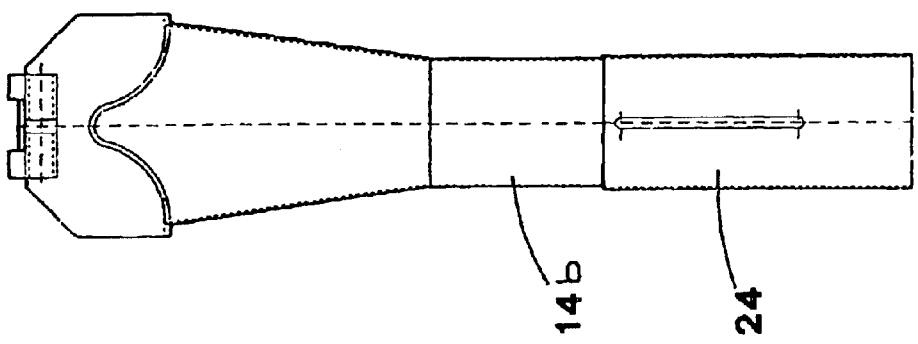
Figure 9:
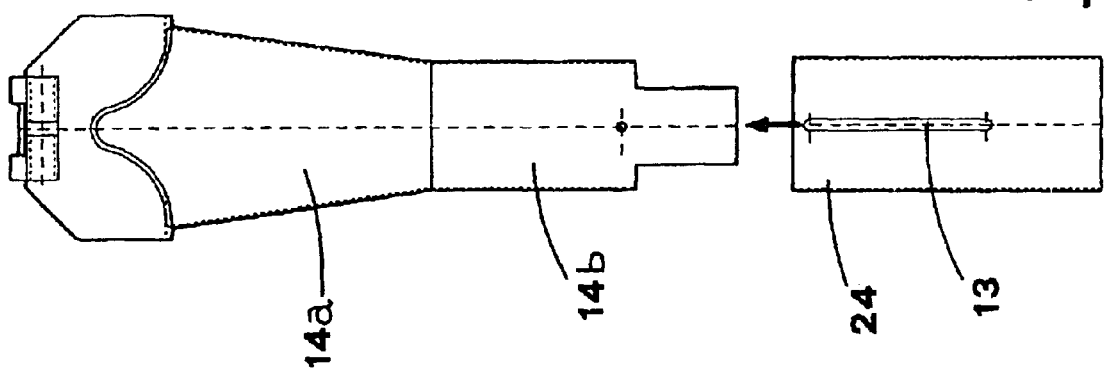

The cross-section of the distal part 14b is oblong with pointed ends (FIG. 5).

The pointed shape of the hollow body facilitates the movement of the articles with respect thereto.

This is particularly advantageous in case of small granules treatment, such as pharmaceutical pellets.

The distal part 14b is open at the bottom and its opposite surfaces feature perforated areas 12.

The perforated hollow bodies 14 are telescopic, so as to adjust their length, as shown in FIGS. 6, 7, 8 and 9, 10, 11.

Thus, it is possible to adjust the penetration depth of the perforated hollow bodies 14 in the mass of articles moving inside the coating pan 1.

The perforated hollow bodies 14 have a terminal separated portion 24, which is mounted sliding on the distal part 14b of the respective hollow body 14.

The terminal portion 24 has a longitudinal slot 13, through which a fastening screw 15 passes.

The screw 15 is screwed into a corresponding threaded seat 16 made in the distal part 14b of the hollow body.

Thus, it is possible to change steplessly the length of the hollow bodies 14 from a minimum to a maximum one, shown in FIGS. 7, 10 and 8, 11, respectively.

It is to be noted that in this case, the perforated areas 12 are made in the terminal portion 24, in correspondence to apertures 17 made in the distal part 14b of the hollow body.

The described machine obtains the object of optimizing the penetration of the perforated hollow bodies in the moving mass of articles to be treated by using either the telescopic hollow bodies, or by using the hollow bodies inclined with respect to the vertical axis and of particular oblong shape with pointed ends.

A very important advantage of the proposed machine derives from its versatility, as it can be used either for coating pharmaceutical or confectionery products with an outer protective layer, or coating the neutral granules with mixtures of active principles and excipients to obtain e.g. pharmaceutical pellets.

It is understood that what above has been described as a pure, not limitative example, therefore possible constructive modifications remain within the protective scope of the present technical solution, as described above and claimed hereinafter.

What is claimed is:

1. A machine for coating granular articles and the like, comprising:

a rotating drum or coating pan (1) rotating around a rotational axis and containing a predetermined mass of articles to be treated;

a tubular manifold (4) having an axis parallel to the rotational axis of said coating pan (1) and set in communication with an outer first pipe (5);

a plurality of perforated hollow bodies (14), extending from said manifold (4) and being dipped into the moving mass of said articles being treated, said perforated hollow bodies (14) being telescopic for adjustment of their length to change a depth of penetration into the moving mass of said articles inside the coating pan (1);

a second pipe (6) connected to said coating pan (1) to create a flow of air for ventilating said articles;

said perforated hollow bodies having a distal part (14b) open at the bottom when the distal part is not mounted on a terminal portion and closed at the bottom when mounted to the terminal portion and has opposite surfaces with perforated areas (12);

said distal part (14b) being inclined with respect to a vertical axis of the hollow body and having an oblong cross-section with pointed ends.

2. A machine, according to claim 1, wherein said telescopic shape is obtained by a separated terminal portion (24), which is slidingly mounted on a distal part (14b) of said hollow bodies (14).

3. A machine, according to claim 1, wherein said terminal portion (24) features a longitudinal slot (13), through which a fastening screw (15) passes, so as to screw into a corresponding threaded seat (16) made in said distal part (14b) of the hollow bodies (14).

4. A machine for coating granular articles and the like, comprising:

a rotating drum or coating pan (1) rotating around a rotational axis and containing a predetermined mass of articles to be treated;

a tubular manifold (4) having an axis parallel to the rotational axis of said coating pan (1) and set in communication with an outer first pipe (5);

a plurality of perforated hollow bodies (14), extending from said manifold (4) and being dipped into the moving mass of said articles being treated, said perforated hollow bodies (14) having a distal part (14b) inclined with respect to a vertical axis of said hollow body and whose cross-section is oblong with pointed ends;

a second pipe (6) connected to said coating pan (1) to create a flow of air for ventilating said articles;

said distal part (14b) of the perforated hollow bodies (14) being open at the bottom when the distal part is not mounted on a terminal portion and being closed at the bottom when mounted to the terminal portion and has opposite surfaces with perforated areas (12).

5. A machine, according to claim 4, wherein said distal part (14b) of the perforated hollow bodies (14) is an extension of a proximal part (14a), extending from said tubular manifold (4), and having a countersunk shape.

6. A machine, according to claim 4, wherein said perforated hollow bodies (14) are telescopic, for adjustment of their length in order to change a depth of penetration in the moving mass of said articles inside the coating pan (1).

7. A machine for coating granular articles and the like, comprising:
- a rotating drum or coating pan (1) rotating around a rotational axis and containing a predetermined mass of articles to be treated;
- a tubular manifold (4) having an axis parallel to the rotational axis of said coating pan (1) and set in communication with an outer first pipe (5);
- a plurality of perforated hollow bodies (14) extending from said manifold (4) and dipped into the moving mass of said articles being treated, which hollow bodies have an oblong cross-section and pointed ends, are telescopic to adjust their length, and have a distal part (14b) inclined with respect to a vertical axis of the same hollow body;
- a second pipe (6) connected to said coating pan (1) to create a flow for ventilating said articles;
- said distal part (14b) being open at the bottom when the distal part is not mounted on a terminal portion and being closed at the bottom when mounted to the terminal portion and having opposite surfaces with perforated areas (12).

* * * * *